No. 868,861. PATENTED OCT. 22, 1907.
O. HOLM.
DRAFT EQUALIZER.
APPLICATION FILED MAR. 25, 1907.
2 SHEETS—SHEET 1.
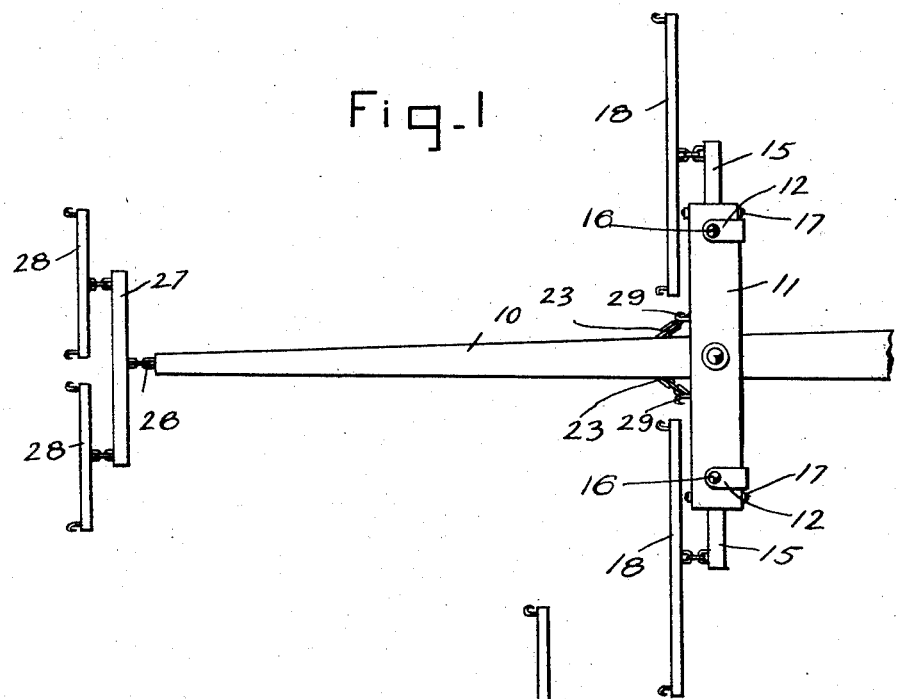
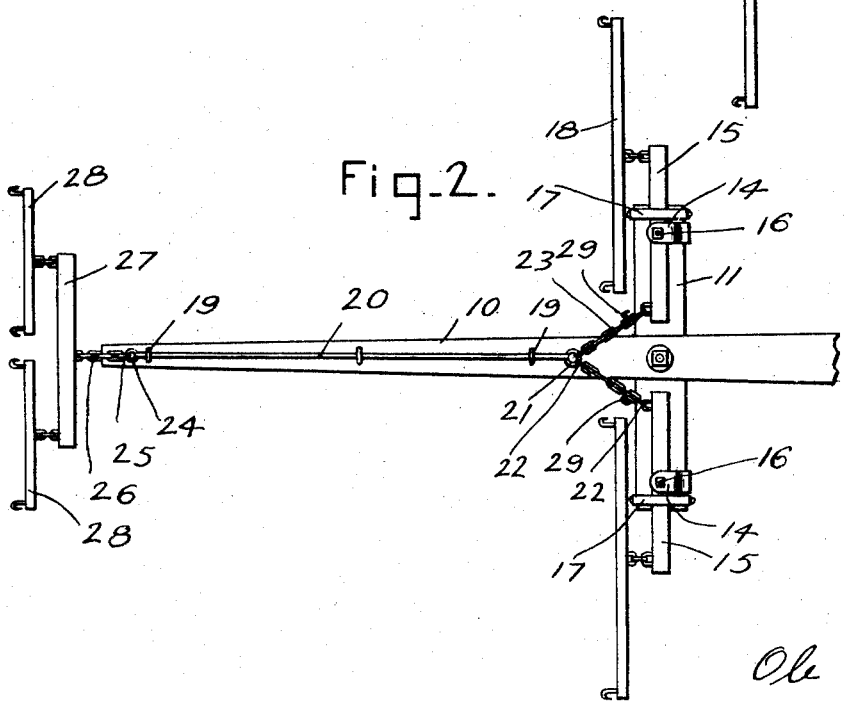

No. 868,861. PATENTED OCT. 22, 1907.
O. HOLM.
DRAFT EQUALIZER.
APPLICATION FILED MAR. 25, 1907.
2 SHEETS—SHEET 2.
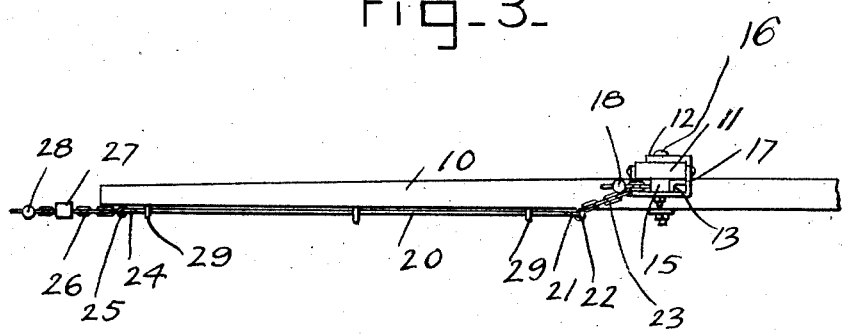
Fig. 3.
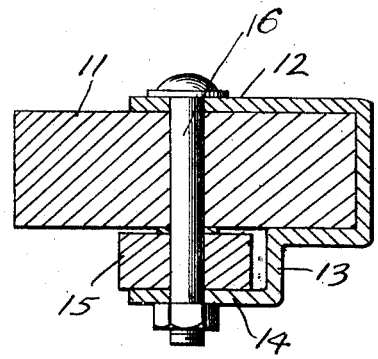
Fig. 4.
Fig. 5.

UNITED STATES PATENT OFFICE.

OLE HOLM, OF MADISON, MINNESOTA.

DRAFT-EQUALIZER.

No. 868,861.

Specification of Letters Patent.

Patented Oct. 22, 1907.

Application filed March 25, 1907. Serial No. 364,447.

*To all whom it may concern:*

Be it known that I, OLE HOLM, a subject of the King of Norway, residing at Madison, in the county of Lac qui Parle, State of Minnesota, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers and more particularly to that class which are designed for use when it is desired to employ two teams of horses in connection with a single pole.

One of the disadvantages to be found in the present devices of this class is that when it is only desired to use one team of horses, considerable difficulty is experienced for the reason that there is too great a degree of lost motion or play between the draft devices in use and the equalizer element for the draft devices which are not in use.

My invention therefore has for its primary object to provide means for holding the equalizer elements, when the front team of horses is not employed, in the same position that they would be held in the actual use of the extra team.

Further features of the invention reside in novel constructions of various parts of the device.

In the accompanying drawings, Figure 1 is a plan view of a pole showing the application of my invention, Fig. 2 is a bottom plan view thereof, Fig. 3 is a side elevation, Fig. 4 is a detail sectional view through one of the hammer straps which serve to hold the equalizer bars to the main equalizer bar, and, Fig. 5 is a bottom plan view of the rear portion of the pole showing the arrangement of parts when only the rear team of horses is employed.

Referring more specifically to the drawings the numeral 10 denotes a vehicle pole and 11 the main equalizer bar of my device which bar is pivotally mounted upon the upper face of the pole. Hammer straps including portions 12 which lie above the main equalizer beam at its ends also have portions which extend beneath the beam and these latter portions are bent downwardly as at 13 and thence forwardly as at 14 in spaced relation to the under side of the beam and for the reception therebetween and the beam of equalizer bars 15, there being pivot bolts 16 engaged through the ends of the portions 12 and 14 of the hammer straps, the ends of the beam, and the bars 15. As an additional support and guide for the equalizer bar there are secured to the extreme ends of the equalizer beam, U-shaped guide brackets 17 between the connecting portions of which and the under side of the equalizer beam project the equalizer bars 15. To the outer ends of these bars are connected swingle trees 18.

Slidably mounted in the bracket 19 upon the under side of the pole 10 is a rod 20 and this rod is provided at its rear end with an eye 21 in which are engaged hooks 22 carried at the free ends of chains 23 which chains are connected with the inner ends of the equalizer bars 15. It will be understood of course that by reason of this construction, the hooks 22 may be disengaged from the eye member 21 under certain conditions which will be presently explained. The rod 20 is also provided at its forward end with an eye 24 with which is removably engaged a hook 25 carried at the rear end of a chain 26. This chain is secured to the middle of a double tree 27 with the ends of which are connected swingle trees 28.

From the foregoing it will be readily understood that the weight of the load will be equally distributed between the four horses drawing the same. Should it however be desired to employ only the rear team of horses, the hooks 22 may be disengaged from the eye 21 at the rear end of the rod 20 and engaged, after being crossed with eyes 29 secured upon the forward edge of the equalizer beam 11 it being understood that when the hooks are so engaged the chains will be stretched to practically the same degree as when both teams of horses are employed and that hence the drawing of the vehicle by the single team will not be interfered with.

What is claimed is—

The combination with a vehicle pole, of an equalizer beam pivoted upon the pole, equalizer bars pivoted beneath the equalizer beam, draft elements connected with the equalizer bars at their outer ends, a rod slidably mounted upon the under side of the pole, said rod being provided at its rear end with an eye, chains connected with the inner ends of the equalizer bars, hooks carried at the free ends of the chains and engageable with the eye at the end of the rod, a chain connected to the forward end of the rod, a draft element connected with the chain, and eye members secured upon the forward edge of the equalizer beam with which the hooks carried by the first mentioned chains may be engaged.

In testimony whereof, I affix my signature in presence of two witnesses.

OLE HOLM.

Witnesses:
O. ELIAS HAUGE,
AMUND HEGNA.